June 7, 1932. H. W. PARTLOW 1,861,509
TEMPERATURE CONTROL
Filed Sept. 3, 1930 3 Sheets-Sheet 1
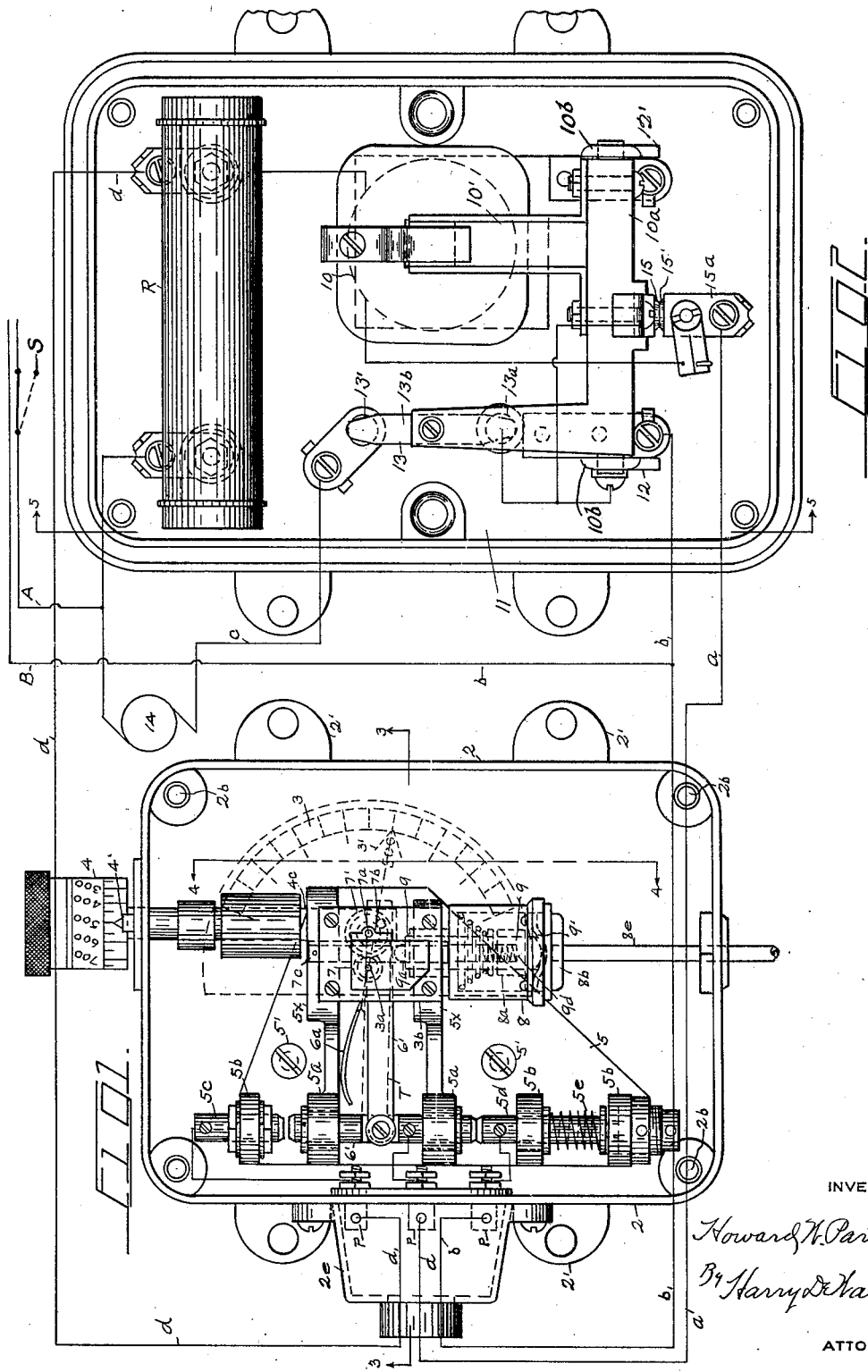
INVENTOR.
Howard W. Partlow
By Harry D. Wallace
ATTORNEY.

June 7, 1932. H. W. PARTLOW 1,861,509
TEMPERATURE CONTROL
Filed Sept. 3, 1930 3 Sheets-Sheet 2
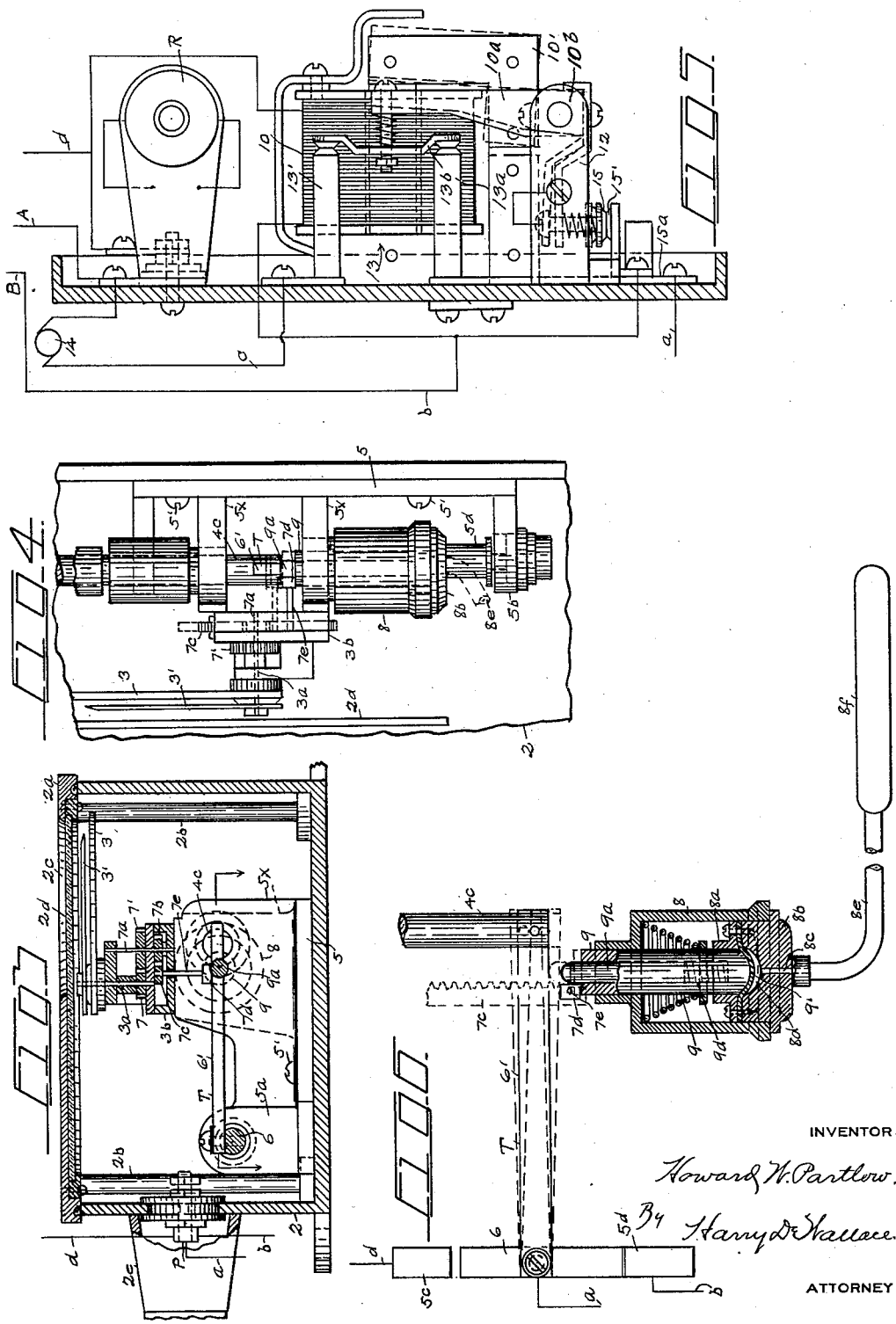
INVENTOR.
Howard W. Partlow.
By Harry D. Wallace.
ATTORNEY.

June 7, 1932.  H. W. PARTLOW  1,861,509
TEMPERATURE CONTROL
Filed Sept. 3, 1930     3 Sheets-Sheet 3
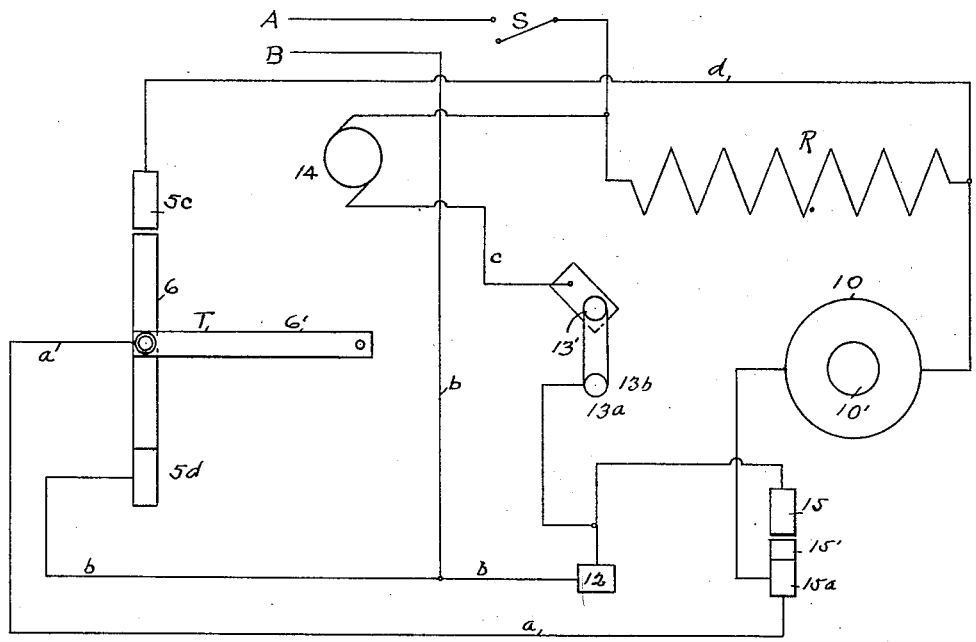
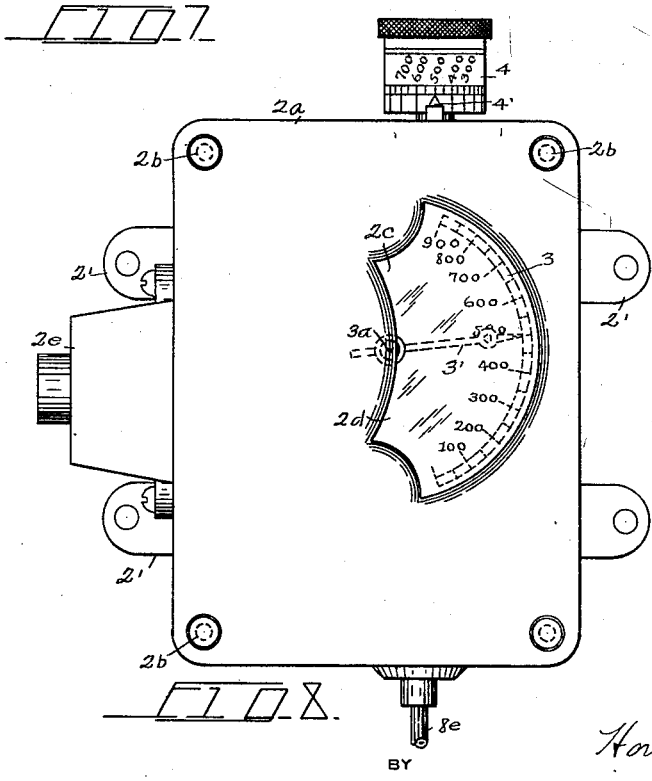
INVENTOR.
Howard W Partlow
BY Harry D Wallace
ATTORNEY Patented June 7, 1932

1,861,509

UNITED STATES PATENT OFFICE

HOWARD W. PARTLOW, OF UTICA, NEW YORK, ASSIGNOR TO THE PARTLOW CORPORATION, OF NEW HARTFORD, NEW YORK, A CORPORATION OF NEW YORK

TEMPERATURE CONTROL

Application filed September 3, 1930. Serial No. 479,563.

This invention relates to a control for temperatures, and the like, and has for its object to provide novel combination of thermal and electrical instrumentalities, by which motor driven blowers, fans, or ordinary gas dispensing appliances used in connection with ovens, furnaces and dipping tanks, may be operated, and the temperatures accurately and reliably controlled. A further object is to provide a novel "contactor", or circuit maker, which may be operated by current derived from the usual commercial electric systems, said contactor comprising spaced terminals between which a thermally operated switch member may play for creating independent or shunt circuits, by the energizing of which a motor, fan, or other heat producing medium may be started or stopped; said contactor being associated with a dial over which a needle operates automatically, to indicate progressively the rise of temperatures to predetermined gauges, for example, in ovens, furnaces, or the like; said switch member being adjustable in advance of a heating operation, by the manual operation of a gauge or indicator, to enable thermally actuated means to move the needle in the direction to indicate the predetermined temperatures; said latter means also being adapted to move said switch-member in the direction for stopping the motor, or shutting off fuel to a burner, when said predetermined stages of temperature are attained, said primary switch and said needle adapted to be moved in the opposite directions by gravity, tension, or other means. A further object is to provide electrical means to directly control the motor circuit, said means including the said contactor, a relay, a main, and also an auxiliary switch, both of said switches being arranged to open and close simultaneously, and said auxiliary switch tending to prevent the actual breaking of the independent circuit that controls operation of the motor, during the shifting of the said switch member by the thermostat, for intermittently stopping the motor when the predetermined temperatures are exceeded.

I attain these objects by the means set forth in the detailed description which follows, and as illustrated by the accompanying drawings, in which—

Figure 1 is a top plan view of the "contactor" and related parts. Fig. 2 is a top plan view of a relay that controls the main and the auxiliary switches, both of the latter being closed. Fig. 3 is a horizontal section, taken on line 3—3 of Fig. 1, showing the clock-work that operates the needle; also showing the primary switch. Fig 4 is a vertical section, taken on line 4—4 of Fig. 1. Fig. 5 is a side elevation of the relay, showing the main and auxiliary switches closed to energize the motor. Fig. 6 is a partial top plan and partial horizontal section, the latter taken on line 6—6 of Fig. 3, showing the primary switch member in position for completing the motor circuit; also showing the thermally controlled means for operating said member to open the main and auxiliary switches for stopping the motor. Fig. 7 is a diagrammatic view of the main and independent circuits, and showing the interlocking thereof by the auxiliary switch connections. Fig. 8 is a front elevation of the contactor unit of Fig. 1.

In the drawings, the contactor and relay are represented as separate units operatively connected with a common source of electricity, as mains A and B, one of said mains including a switch S, as shown in Figs. 1, 2 and 7.

Referring to Figs. 1 and 3, 2 represents a casing having lugs 2' to attach the contactor unit to a support, and having a cover 2a, held in place by bolts 2b, the cover having a crescent-shaped opening 2c, closed by a transparent disc 2d, through which a semi-circular dial 3 and a needle 3' may be observed. At the top of the casing is mounted a cylindrical scale 4, bearing predetermined temperature indicia, and a pointer 4'. The body 4 is rotatable to bring the graduations of the scale to the reading position 4'. At one side of the casing, is mounted a housing 2e, in which is disposed a number of binding posts P, that are included in the several independent or shunt circuits supplied by mains A and B, as shown. Within the casing 2, is mounted a bracket 5, secured by screws 5', and having a plurality of lugs 5a—5b, the latter having perforations that align axially. The lugs 5a are formed with arms 5x, that extend horizontally across the base 5, and support the dial, needle 3' and related parts, to be described in detail below. The top and bottom lugs 5b, support similar cylindrical terminals, as 5c—5d, which may be suitably insulated from the bracket. The said terminals are adjustable axially, and the terminal 5d is preferably resiliently held in its lowermost position by spring 5e. The contactor proper is preferably in the form of T, whose head 6 is cylindrical and is movable axially in the lugs 5a to contact alternately with the aligning terminals 5c—5d. The stem 6' of the T is disposed between the arms 5x and its ends are pivoted respectively to the head 6, and a rod 4c which is movable axially by the rotation of the scale 4, to raise and lower the left end of the stem 6', as shown in Fig. 6. The needle 3' is mounted upon a shaft 3a, which passes loosely through the dial 3, and is rigid to a pinion 7, disposed in a housing 3b, supported by the arms 5x. The pinion 7 is driven by a gear 7' mounted on a shaft 7a, upon which is also mounted a pinion 7b that meshes with and is driven by a rack 7c, which reciprocates in a way of the housing 3b. The reciprocation of the rack 7c, as shown in Figs. 4 and 6, rotates the needle away from and towards the lowest graduations of the dial 3, which, according to the present arrangement, means no temperature to be regulated. The needle 3' is operated entirely thermostatically by a mechanism, shown in detail in Fig. 6, as follows: 8 represents a cylindrical casing which may be screwed into one of the arms 5x, in which is disposed axially a reciprocable plunger 9. One end of this plunger is in constant engagement with a diaphragm 9', which is clamped between a collar 8a and a head 8b, the said head being formed with a central passage 8c, that communicates with a cavity 8d, the latter adapted to be supplied with mercury, for example, by a tube 8e and an integral bulb 8f. The opposite end of the plunger 9 protrudes from the casing 8 and is normally in engagement with a block 7d, mounted on the lower end of a rod 7e, and is rigid to the rack 7c. The outward movement of the plunger 9 by the expansion of the mercury, raises the rack, as from the full line to the dotted line position, shown in Fig. 4. The plunger 9 is bored axially to receive a reciprocable pin 9a, which is normally extended beyond the outer end of the plunger, in the plane of stem 6', by a cushion spring 9d. The free end of pin 9a alone engages the stem 6' of the T, and when the plunger moves outwardly sufficiently to bring the tip of the pin into contact with the stem 6', the pin will be primarily moved inwardly by the resistance offered by said stem, due to the tension of a compression spring 6a, that normally tends to hold the head 6 in engagement with the terminal 5d. The raising of the rack 7c, moves the needle 3' in the direction for indicating a rise in the temperature controlled by the contactor and related parts, until a predetermined gauge corresponding to the scale 4 is indicated on dial 3, at which time, the pin 9a actuated by the continued outward movement of the plunger 9, engages stem 6' and moves the head 6 away from the terminal 5d and into engagement with the terminal 5c. This shuts off a motor or burner by by-passing the relay 10, opens the switch 13, and prevents the temperature from exceeding the predetermined stage. The bulb 8f is usually disposed over a burner flame, or over a pilot light, and in the case of a motor driven blower, that forces the fuel and air through a torch or other heating element, the bulb is also disposed in the path of the flame and effects the thermal control, as described.

When the contactor is employed for regulating extremes of temperature, as from 100° to 1000°, the manipulation of the scale 4 shifts the stem 6' of the T towards the pin 9a for the lower temperatures, and away from said pin for the higher temperatures, which means that the thermal changes which are effected by the control will be longer delayed for the high than for the low temperatures.

The relay unit, which is not my invention, comprises a solenoid coil 10 and an inverted U-shaped armature 10', the latter being rockably supported by an L-shaped insulation member 10a, which is pivoted at 10b, in brackets 12—12', that are secured to a base 11 (see Figs. 2 and 5). 13 represents the main switch that controls the circuit of a motor 14, said switch comprising terminals 13'—13a, supported by the base, and a bridge 13b, which is supported by the member 10a. The terminal 13' connects with the bracket 12, while the terminal 13a connects with one pole of the motor, the other pole of the motor connecting with one of the supply mains, as A.

The member 10a also supports one terminal as 15, of an auxiliary or interlocking switch, the other member 15' of said switch comprising a terminal 15a, which connects with the head 6 of the contactor by a wire a. The terminal 15a also connects with the coil 10 of the relay, resistance R, and main A, the resistance being included in all circuits but that which operates the motor. The coil 10 is also in circuit with the terminal 5c of the contactor via line d. The switches 13 and 15 of the relay are opened and closed simultaneously by the operation of the solenoid, to start the motor and also to provide a holding or interlocking circuit, including the switch 15—15′, which prevents, as long as the latter switch is closed, the breaking of the two reduced circuits controlled by the T. The bracket 12 of the relay connects with the main B and also the contactor terminal 5d by a wire b. The bracket 12 also connects with the terminal 15 of the auxiliary switch to form the interlocking circuit, as shown in Figs. 1, 2 and 7.

The operation of my temperature control is as follows: Assuming that the control is applied to a heating plant comprising for example, a burner and a motor driven blower (not shown), the bulb 8f of the thermostat being disposed in the zone of the flame of the burner, and the member T being in contact with the terminal 5d, the first step in the operation of the control is to set the scale 4 to indicate a predetermined temperature and then to close the switch S, to connect the mains A—B with the control. This completes the primary control circuit, shown in Figs. 1, 2 and 7, as follows: Main A to R, and coil 10 to terminal 15a, and via wire a to T, thence to terminal 5d and wire b to main B. This energizes the coil 10 and closes switches 13—15 and the motor takes current via main A, motor, line c to switch 13, to bracket 12 and wire b to main B, and starts the motor. The motor 14 will then start the blower, which will operate until the needle indicates that the temperature at the burner corresponds to that of the scale 4. When the right temperature has been attained, the mercury in the line 8e—8f will have expanded sufficiently to cause the pin 9a to shift member T from contact 5d to contact 5c, which completes the secondary shunt circuit (see Figs. 1, 2 and 7), as follows: Main B and line b to 12, to 15—15′—15a, via a to T and terminal 5c, thence via wire d and R to main A.

In practice, the intervals between the shiftings of the contactor by the thermostatic member 9a and the spring 6a, are relatively short, and by the peculiar and extremely simple arrangement of the several parts of the contactor that control the electric circuits and mechanisms, when taken with the cooperation of the thermostat, the contactor will ordinarily be promptly shifted, as described, whenever there is a rise or fall of one or two degrees of the generated heat, thereby insuring efficient, positive, safe and economical operation of an oven or other heating plant.

Having thus described my invention, what I claim, is—

1. In a temperature control, the combination with a motor, a source of current supply for said motor, a switch for energizing said motor, a movable temperature predetermining gauge, and a pair of independent shunt circuits having terminals, of a contactor comprising a member connected at one end to said gauge and having its opposite end adapted to oscillate between terminals of said pair of independent shunt circuits, said contactor being normally in circuit with an electro-magnet for operating said motor switch through one of said shunt circuits to start the motor, and thermally controlled means connected to said gauge to shift said contactor into engagement with the other of said shunt circuits for short circuiting said electro-magnet to effect stopping of the motor.

2. In a temperature control, the combination with a motor, a source of current supply for said motor, an electro-magnetic switch for energizing said motor, a movable temperature predetermining indicator, and a pair of independent shunt circuits having terminals, of a contactor comprising a T-shaped member having its stem portion pivoted to a part of said indicator, the head of said member being disposed between and spaced from the terminals of said shunt circuits, said head being normally positioned to close one of said circuits and to actuate the magnetic switch for energizing the motor and thermal means for actuating said T-shaped member to close the other of said shunt circuits whereby to short circuit said electro-magnetic switch and motor to effect stopping of the latter at predetermined temperatures.

3. A temperature controlled current supply system for motors or the like including a main circuit having a motor and a normally open switch therein, a secondary circuit in parallel with the main circuit and having an electro-magnet connected thereto, and a normally open shunt circuit, a member adapted to oscillate between the secondary and the shunt circuits, said member normally closing the secondary circuit to actuate the electro-magnet and thereby the switch to start said motor, and temperature controlled means for moving said member into said shunt circuit to short circuit the secondary circuit to effect stopping of the motor.

In testimony whereof I affix my signature.
HOWARD W. PARTLOW.